INTEGRATED CIRCUIT AND METHOD OF MAKING THE SAME

Filed Dec. 3, 1969 5 Sheets-Sheet 1

INVENTORS
TAKASHI TOKUYAMA, TAKASHI TSUCHIMOTO,
TAKAHIDE IKEDA, SHIGERU NISHIMATSU
and HISUMI SANO
BY Craig, Antonelli, Stewart & Hill
ATTORNEYS

INVENTORS

TAKASHI TOKUYAMA, TAKASHI TSUCHIMOTO,

TAKAHIDE IKEDA, SHIGERU NISHIMATSU, and HISUMI SANO

BY

Craig, Antonelli, Stewart & Hill

ATTORNEYS

INTEGRATED CIRCUIT AND METHOD OF MAKING THE SAME

INVENTORS

TAKASHI TOKUYAMA, TAKASHI TSUCHIMOTO, TAKAHIDE IKEDA, SHIGERU NISHIMATSU and HISUMI SANO BY Craig, Antonelli, Stewart & Hill

ATTORNEYS

INVENTORS
TAKASHI TOKUYAMA, TAKASHI TSUCHIMOTO,
TAKAHIDE IKEDA, SHIGERU NISHIMATSU
and HISUMI SANO
BY
Craig, Antonelli, Stewart & Hill
ATTORNEYS

INTEGRATED CIRCUIT AND METHOD OF MAKING THE SAME

Filed Dec. 3, 1969

INVENTORS
TAKASHI TOKUYAMA, TAKASHI TSUCHIMOTO,
TAKAHIDE IKEDA, SHIGERU NISHIMATSU
and HISUMI SANO
BY
Craig, Antonelli, Stewart & Hill
ATTORNEYS 3,736,192

INTEGRATED CIRCUIT AND METHOD OF MAKING THE SAME

Takashi Tokuyama, Hoya-shi, Takashi Tsuchimoto, Kodaira-shi, Takahide Ikeda, Kokubunji-shi, and Shigeru Nishimatsu and Hisumi Sano, Tokyo, Japan, assignors to Hitachi, Ltd., Takyo, Japan Filed Dec. 3, 1969, Ser. No. 881,739
Claims priority, application Japan, Dec. 4, 1968, 43/88,303
Int. Cl. H01l 7/54
U.S. Cl. 148—1.5 9 Claims

ABSTRACT OF THE DISCLOSURE

An integrated circuit comprising a semiconductor epitaxial layer having two or more semiconductor circuit elements such as a transistor, diode and resistor formed on one surface thereof, and a high resistivity region formed by implantation of ions from the surface of the epitaxial layer, the semiconductor circuit elements being electrically divided into a plurality of groups by the high resistivity region of the epitaxial layer formed by ion implantation.

BACKGROUND OF THE INVENTION

Field of the invention

This invention relates to an integrated circuit and a method of making the same. More particularly, this invention relates to a monolithic integrated circuit having a plurality of semiconductor circuit elements isolated from each other by a high resistivity region of amorphous structure or the like and to a method of producing the high resistivity region in the surface of the semiconductor substrate.

Description of the prior art

According to a method generally employed heretofore, a p-n junction is used to isolate semiconductor circuit elements of a semiconductor integrated circuit from each other. This method, however, involves the following drawbacks:

(a) A diffusion treatment for an extended period of time at high temperatures is required for forming the isolating layer, resulting in the undesirable diffusion of impurities due to high temperatures and in a deterioration of the operating characteristics. The method is further defective in that an extended period of time is required for the production of the circuit elements.

(b) The isolating layer, as is formed by diffusion, extends not only in the direction of depth but also in the transverse direction. Thus, a large area requirement for the isolating layer reduces the degree of integration of the circuit elements.

(c) The isolation by the p-n junction produces a parasitic capacitance between the circuit element and the substrate thereby deteriorating the high frequency characteristics of the circuit element.

Another conventional method for isolating circuit elements of a semiconductor integrated circuit from each other employs an etching solution to etch away the substrate portion existing between the circuit elements. This method is also defective in that the etched portion extends in the transverse direction thereby reducing the degree of integration of the circuit elements as in (b).

SUMMARY OF THE INVENTION

It is therefore an object of the present invention to provide a semiconductor integrated circuit having an improved isolating means for isolating one circuit element from another and to a method of making such a semiconductor integrated circuit.

Another object of the present invention is to provide a novel method of isolation by which circuit elements of a semiconductor integrated circuit can be isolated from each other in a short period of time.

A further object of the present invention is to provide a novel method of isolation which requires a very small area of the surface of the semiconductor substrate for the isolation between circuit elements of a semiconductor integrated circuit thereby improving the degree of integration of the circuit elements of the integrated circuit itself.

In order to attain the above objects, the present invention provides a method of making a semiconductor integrated circuit which comprises forming a thin layer of a semiconductor on a semiconductor substrate or insulator substrate in an electrically insulated relation from the substrate, selectively doping the thin layer with the desired impurities to form a plurality of semiconductor electrical circuit elements such as a transistor, diode and resistor, and implanting a large amount of ions of a desired element in the surface portions of the thin semiconductor layer lying between the circuit elements to form in each of the ion implanted regions a high resistivity region extending from the surface of the thin semiconductor layer to the substrate for electrically isolating the semiconductor electrical circuit elements from each other by the high resistivity region. The present invention also contemplates the provision of a semiconductor integrated circuit made by such a method.

DESCRIPTION OF THE PREFERRED EMBODIMENTS

The present invention is based on an experimental discovery that a high resistivity region is formed in a semiconductor substrate when accelerated ions are implanted in a part or throughout the semiconductor substrate to produce a lattice defect in the semiconductor by the ion bombardment and that the region thus implanted with the ions turns into an amorphous structure having an electrically insulating property as the number of ions is increased. The amorphous state, as commonly understood, thereby refers to such a state that atoms or molecules in a solid state do not form a regular space lattice.

Figure 1:
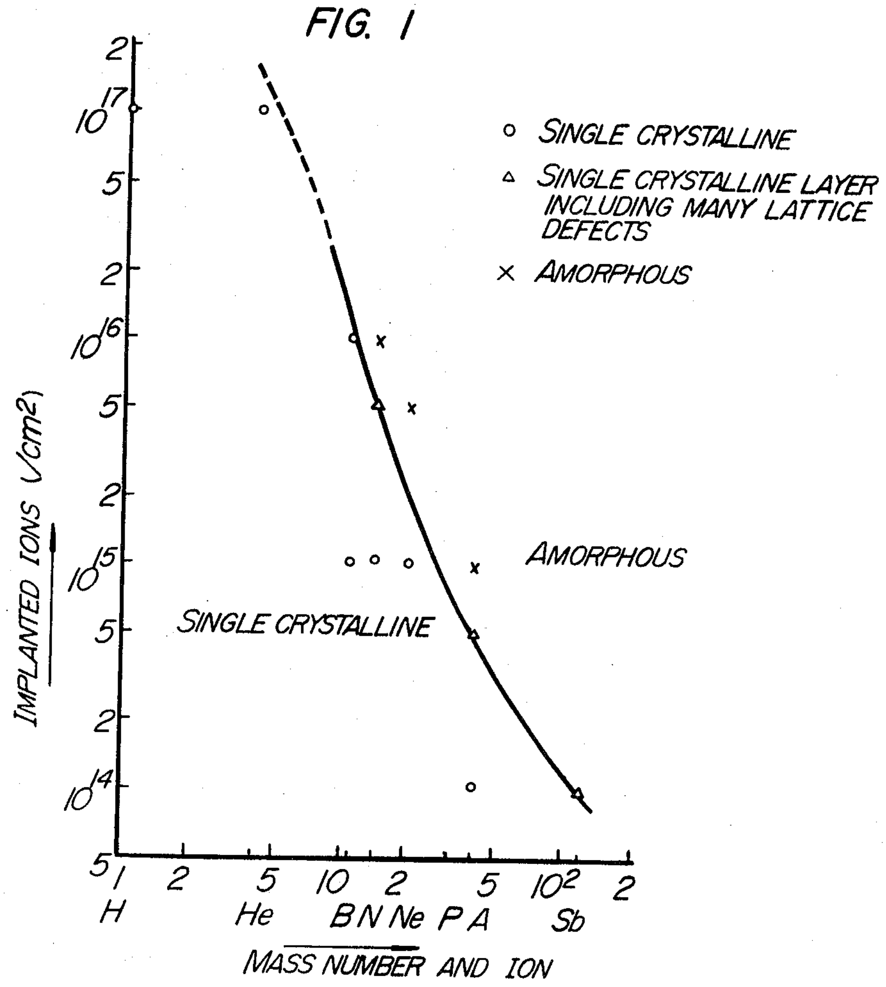
FIG. 1 is a graph showing how a defect is produced in a semiconductor crystal due to the implantation of ions.
Figure 2:
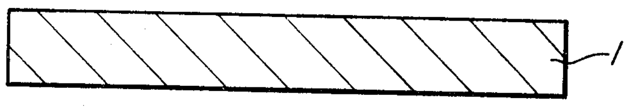
FIGS. 2 through 15 are schematic vertical sectional views showing successive steps of forming a transistor and a resistor in the surface of a thin layer of a semiconductor to obtain a semiconductor integrated circuit in accordance with an embodiment of the present invention.

FIG. 1 shows the result of an experiment on a silicon crystal to determine how lattice defects are produced in the semiconductor crystal due to ion implantation.

The curve shown in FIG. 1 represents the amount of implanted ions, at which the ion implanted region starts to become amorphous when various ions are implanted in the silicon substrate with an energy of 100 kev. In FIG. 1, the horizontal axis represents the mass number of various elements and the vertical axis represents the amount of implanted ions. It will be seen from FIG. 1 that heavier ions produce more lattice defects with a lesser amount of implantation and the penetration depth of the heavier ions is quite shallow. As the amount of implanted ions approaches the curve in FIG. 1, the region implanted with the ions approaches an intrinsic state due to the capture of conduction electrons and holes by the lattice defects produced and thus shows a very high resistivity. When the ions are implanted in an amount beyond the curve in FIG. 1, an amorphous state results and the rerion implanted with the ions shows a further increased resistivity and is easily etched by hydrofluoric acid or any other etching solution for silicon. The present invention utilizes a high resistivity region obtained in this manner as an isolation layer between circuit elements of an integrated circuit.

In the present invention, an element which does not act as an active impurity in a semiconductor is preferably used to provide ions to be implanted in a thin semiconductor layer. Thus, hydrogen, the gases of rare elements such as helium, neon, argon, krypton and xenon, and elements of semiconductor such as silicon, carbon, germanium is preferable. In order to form a high resistivity region of a desired shape in a thin semiconductor layer by ion implantation, a film resistive to ion implantation may be formed on the thin semiconductor layer, a hole may be bored at a desired portion of the film to partly expose the thin semiconductor layer and then ions of a predetermined element may be directed onto the entire surface of the film overlying the thin semiconductor layer. A high resistivity layer corresponding to the shape of the hole in the ion resistive film is formed in the thin semiconductor layer by the above process. The film resistive to ion implantation may be a layer of silicon dioxide, silicon nitride or alumina or a thin layer of metals such as tantalum, molybdenum, chromium, aluminum, gold or nickel.

The method of forming the thin semiconductor layer may be any one of the epitaxial growth methods and the liquid growth methods which are commonly employed within semiconductor industry. The thin semiconductor layer must be formed in an electrically insulated relation from the substrate. Thus, the thin semiconductor layer may be grown on a single crystalline substrate of an electrically insulating material such as sapphire or on a substrate of a semiconductor having a conductivity type opposite to the conductivity type of the thin semiconductor layer. In lieu of the above, a hetero-junction may be utilized. That is, a thin layer of a semiconductor such as GaAs may be formed on a germanium substrate.

Two examples of the present invention will now be described with reference to the drawings.

EXAMPLE 1

Figure 3:
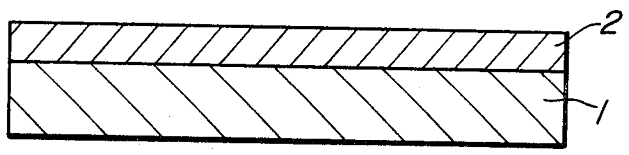
Figure 4:
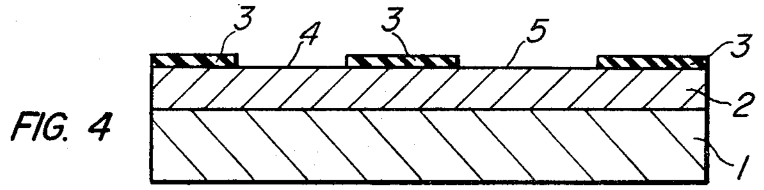
Figure 5:
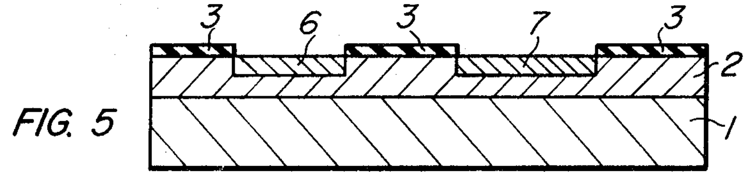
Figure 6:
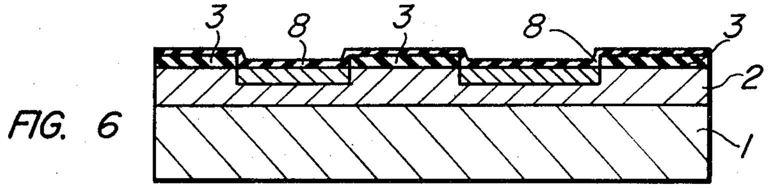
Figure 7:
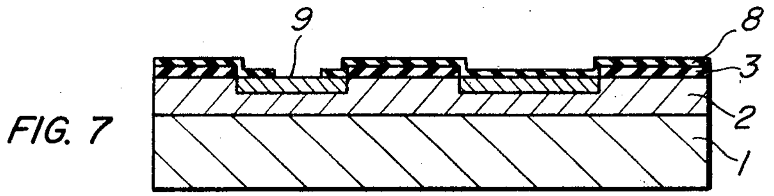
Figure 8:
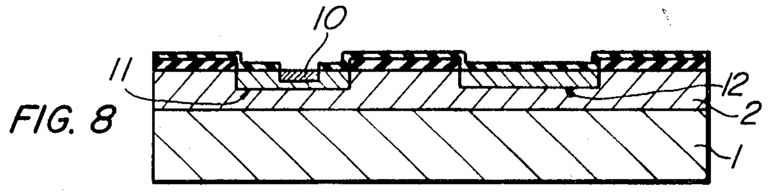

Referring to FIGS. 2 through 15, the reference numeral 1 designates a single crystalline substrate of an n-type silicon. An epitaxial layer 2 of a p-type silicon is formed on one surface of the substrate 1 by the known epitaxial growth method as shown in FIG. 3. While it is customary to form the epitaxial layer 2 by reducing silicon tetrachloride by hydrogen, it may also be formed by the thermal decomposition of monosilane. Although the thickness of the semiconductor epitaxial layer 2 is not limited, it is commonly of the order of from 3 to 10$\mu$. After forming the epitaxial layer 2, tetraethoxysilane is subjected to thermal decomposition to deposit a first mask layer 3 in the form of a silicon dioxide film on the epitaxial layer 2, and the photoetching technique is used to bore holes 4 and 5 of predetermined shapes in the silicon dioxide layer 3 as shown in FIG. 4. The substrate 1 having the above covering is then placed in a thermal diffusion furnace in which an n-type impurity is thermally diffused into the exposed portions of the semiconductor epitaxial layer 2 through the holes 4 and 5 in the silicon dioxide film 3 to form layers 6 and 7 doped with the n-type impurity as shown in FIG. 5. After forming the impurity-doped layers 6 and 7, a second mask layer 8 in the form of a silicon dioxide film is newly deposited as shown in FIG. 6 and a hole 9 is bored in the second mask layer 8 by the photoetching technique as shown in FIG. 7. A p-type impurity is diffused into the semiconductor epitaxial layer through this hole 9 to form a layer 10 doped with a p-type impurity. By the above steps, a pnp transistor element 11 and a resistor element 12 are formed in the semiconductor epitaxial layer as shown in FIG. 8.

Figure 9:
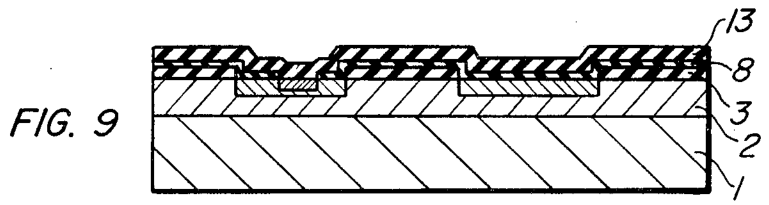
Figure 10:
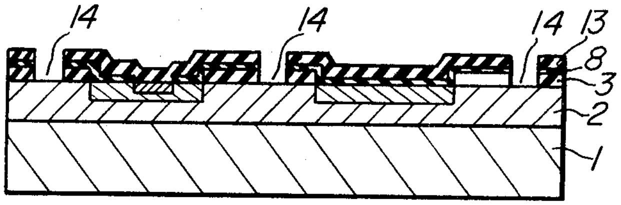
Figure 11:
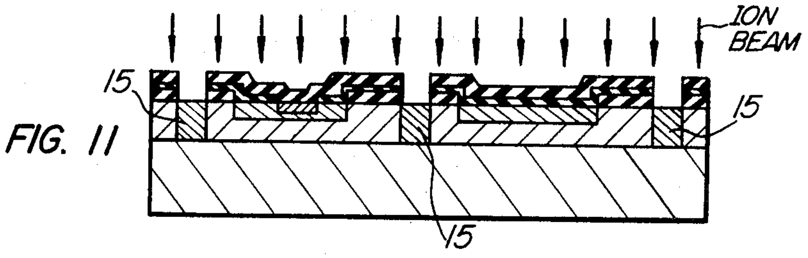
Figure 12:
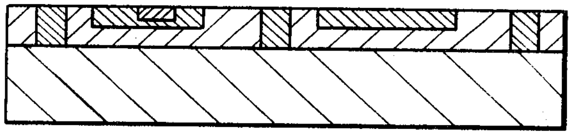
Figure 13:
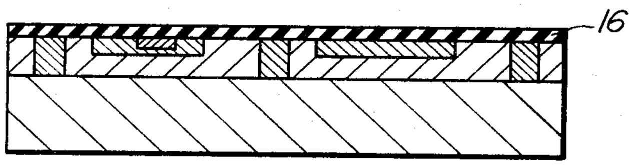
Figure 14:
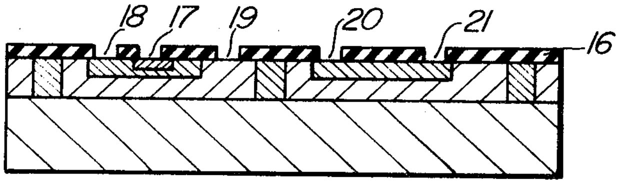
Figure 15:
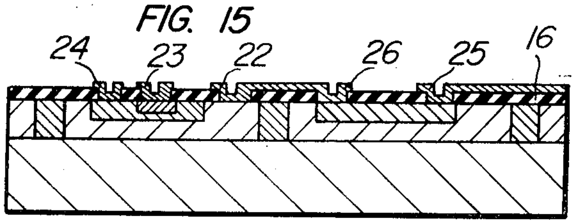

After forming the transistor element 11 and the resistor element 12, a sufficiently thick third mask layer 13 in the form of a silicon dioxide film is deposited on the epitaxial layer as shown in FIG. 9. This third mask layer 13 must have a sufficient thickness so that it serves as an ion implantation resistive film which is resistive to ions implanted in the later step. In lieu of the silicon dioxide film, the third mask film 13 may be an evaporated layer of a metal such as tantalum, chromium, molybdenum, aluminum, gold or nickel. After forming the third mask film 13, holes 14 are bored in desired portions of the mask layer 13 to expose parts of the epitaxial layer 2 as shown in FIG. 10. These holes 14 desirably have such a shape that they surround the semiconductor circuit elements. The semiconductor substrate is then placed in an ion irradiation apparatus and beams of ions of a desired element are directed to the semiconductor substrate as shown in FIG. 11. The ions are not implanted in the portions of the semiconductor epitaxial layer covered by the mask layer 13, but the ions are implanted in the portions of the epitaxial layer exposed from the holes 14 in the mask layer 13 with the result that high resistivity regions 15 extending to the surface of the semiconductor substrate are formed in these portions. The semiconductor electrical circuit elements are electrically isolated from each other by these high resistivity regions 15. After electrically isolating the circuit elements from each other in this manner, the mask layers are completely removed from the semiconductor epitaxial layer as shown in FIG. 12 and then a clean silicon dioxide film 16 about 6,000 A. thick is deposited on the semiconductor epitaxial layer by the thermal decomposition of tetraethoxysilane as shown in FIG. 13. Holes 17 through 21 are bored into desired portions of the silicon dioxide film 16 by the photoetching technique as shown in FIG. 14 so that the emitter electrode portion, base electrode portion and collector electrode portion of the transistor element 11 and the corresponding electrode portions of the resistor element 12 are exposed through the respective holes 17, 18, 19, 20 and 21. Aluminum is then deposited over the entire surface of the silicon dioxide film 16 and those portions of the aluminum layer other than predetermined portions are removed by the photoetching technique so as to connect the transistor element with the resistor element according to a desired circuit pattern to obtain a semiconductor integrated circuit as shown in FIG. 15. The reference numeral 22 in FIG. 15 designates the evaporated wiring layer formed by the evaporation of aluminum.

Figure 16:
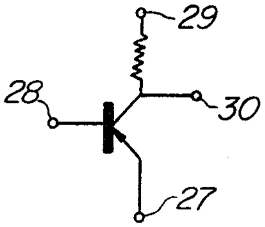
FIG. 16 is a circuit diagram of the semiconductor integrated circuit shown in FIG. 15.

FIG. 16 is a circuit diagram of the basic integrated circuit shown in FIG. 15. In FIG. 16, terminals 27, 28, 29 and 30 correspond to terminals 23, 24, 25 and 26 in FIG. 15, respectively. In the integrated circuit shown in FIG. 15, the semiconductor circuit elements are isolated from the substrate by the p-n junction and are isolated from each other by the high resistivity layers 15 formed by the implantation of ions.

Such a high resistivity layer 15 may be formed by, for example, implanting $10^{17}$ to $10^{18}$ helium ions per square centimeter with an energy of 250 kev. or 100 kev. when the epitaxial layer has a thickness of $3\mu$.

EXAMPLE 2

This example relates to an integrated circuit employing a sapphire substrate.

Figure 17:
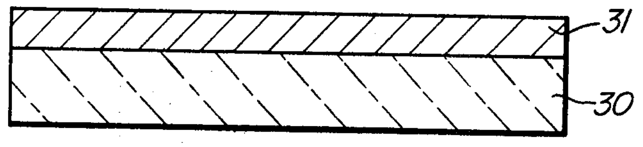
FIGS. 17 through 29 are schematic vertical sectional views showing successive steps of forming a plurality of semiconductor circuit elements in the surface of a thin semiconductor layer formed on an insulator substrate to obtain a semiconductor integrated circuit in accordance with another embodiment of the present invention.
Figure 18:
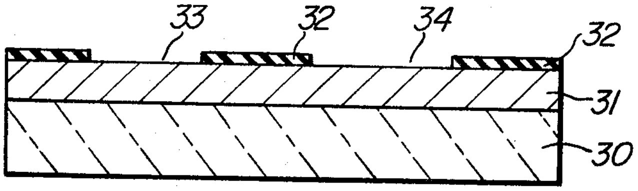
Figure 19:
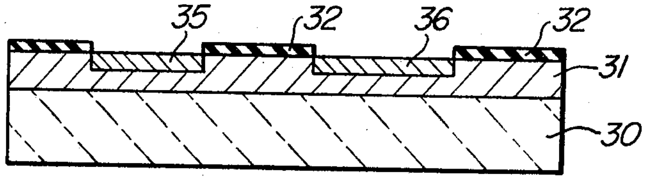
Figure 20:
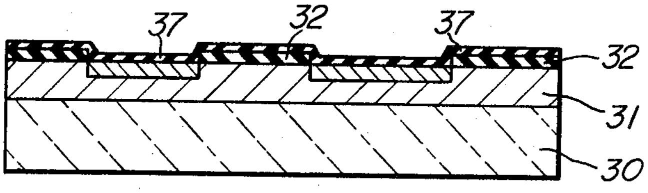
Figure 21:
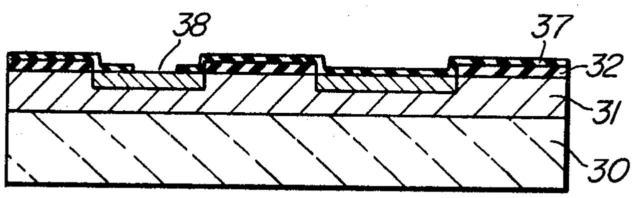
Figure 22:
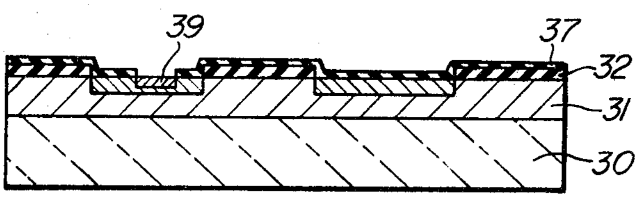
Figure 23:
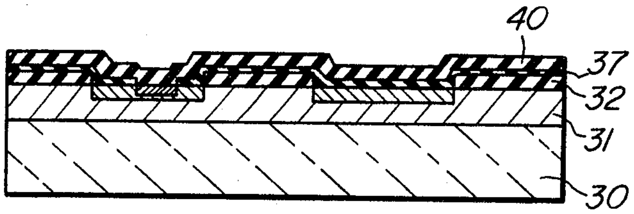
Figure 24:
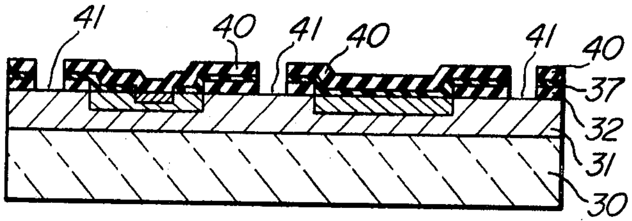

Referring to FIGS. 17 through 29 showing in schematic vertical section the successive steps for the manufacture of such an integrated circuit, the reference numeral 30 designates a sapphire substrate. An epitaxial layer 31 of p-type silicon about $3\mu$ thick is epitaxially grown on one surface of the sapphire substrate 30 as shown in FIG. 17. A silicon dioxide film 32 is deposited on the epitaxial layer 31 and holes 33 and 34 are bored in desired portions of the silicon dioxide film 32 by the photoetching technique as shown in FIG. 18. An n-type impurity is thermally diffused into the semiconductor epitaxial layer 31 through these holes 33 and 34 to form n-type layers 35 and 36 doped with the n-type impurity as shown in FIG. 19. A fresh silicon dioxide film 37 is then deposited on the epitaxial layer as shown in FIG. 20. A hole 38 is bored in a desired portion of the silicon dioxide film 37 as shown in FIG. 21 and a p-type impurity is diffused into the n-type layer 35 through the hole 38 to form a p-type layer 39 therein as shown in FIG. 22. After the above steps, a silicon dioxide film 40 having a sufficient thickness to resist implantation of ions is deposited on the epitaxial layer as shown in FIG. 23. Then, the photoetching technique is used to bore holes 41 of a desired shape in the silicon dioxide films covering the epitaxial layer as shown in FIG. 24.

Figure 25:
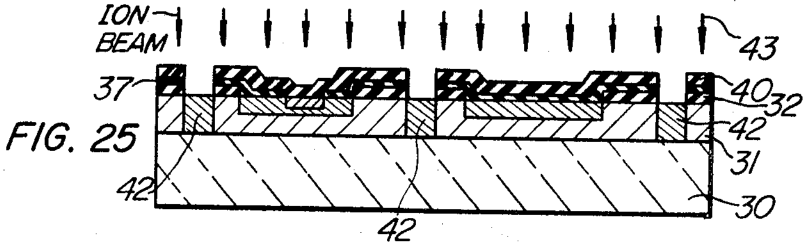

The specimen is then placed into an ion irradiation apparatus and beams of ions 43 of a desired element are directed onto the epitaxial layer. The ions are not implanted in the portions of the epitaxial layer covered by the silicon dioxide film 40, but the ions are implanted in the portions of the epitaxial layer exposed from the holes 41 with the result that high resistivity layers 42 are formed in these portions as shown in FIG. 25. Such a high resistivity layer 42 may be formed by implanting $10^{17}$ to $10^{18}$ helium ions per square centimeter with an energy of 250 kev.

Figure 26:
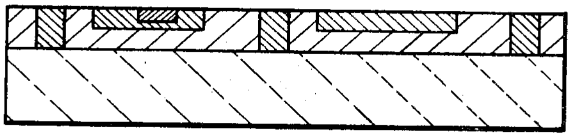
Figure 27:
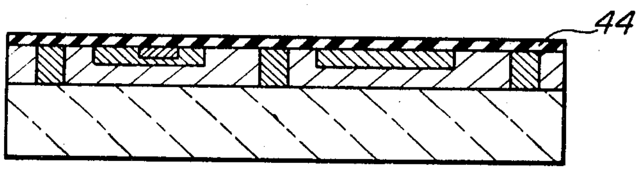
Figure 28:
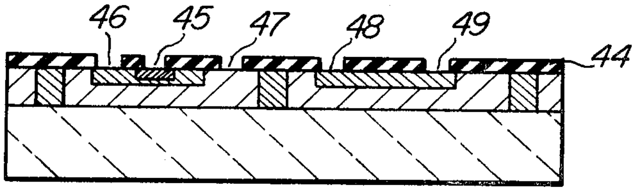
Figure 29:
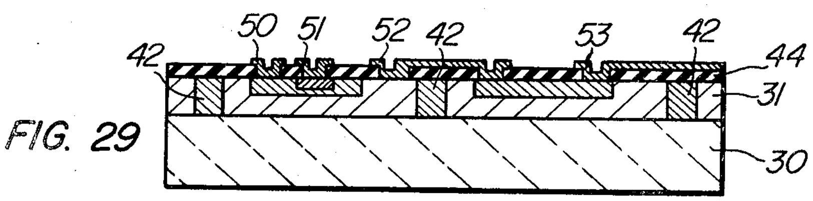

After forming the high resistivity layers, the silicon dioxide films covering the epitaxial layer are completely removed as shown in FIG. 26. A fresh silicon dioxide film 44 is deposited on the epitaxial layer as shown in FIG. 27 and predetermined holes 45, 46, 47, 48 and 49 are bored in the silicon dioxide film 44 as shown in FIG. 28. These holes expose the electrode portions of the semiconductor circuit elements. After this step, aluminum is evaporated over the entire surface of the silicon dioxide film 44, and those portions of the evaporated aluminum layer other than certain predetermined portions 50, 51, 52 and 53 are removed so as to connect the semiconductor circuit elements formed in the epitaxial layer with each other according to a desired circuit pattern.

By the above steps, an integrated circuit can be formed in the semiconductor epitaxial layer 31 formed on the sapphire substrate 30. In the integrated circuit thus constructed, the electrical circuit elements are electrically isolated from each other by the high resistivity layers 42 formed by the implantation of ions.

The advantages that can be obtained with the above manner of isolation of the circuit elements from each other are as follows:

(1) The undesirable parasitic capacitance which inevitably results from the prior art isolation by a p-n junction can be reduced to a minimum.

(2) Ions can be implanted in a short period of time at room temperature thereby simplifying the manufacturing steps. Ion implantation at room temperature is also advantageous in that the objectionable influence on the operating characteristics of circuit elements due to diffusion at high temperature can be avoided.

(3) Any substantial spread of the ion implanted region in a direction at right angles with respect to the direction of ion implantation is not seen, unlike the prior art method which employs the diffusion. Therefore, isolation bands of a very small area can be defined by the photoetching method and the degree of integration of circuit elements can be thereby increased.

While preferred embodiments of the present invention have been described in the above by way of example, it will be understood that the present invention is in no way limited to such specific embodiments and many changes and modifications may be made therein without departing from the spirit of the present invention. For example, the semiconductor preferably employed in the present invention is in no way limited to silicon and many other semiconductors such as germanium, GaAs, $GaAs_{1-x}P_x$, GaP, InSb and InP may be used in lieu of silicon although silicon is employed in the embodiments of the present invention.

We claim:

1. A method for fabricating an integrated circuit comprising the steps of:

preparing a semiconductor substrate of one conductivity type;

forming a semiconductor epitaxial layer of another conductivity type on the surface of the substrate;

forming a first mask layer on the surface of the semiconductor epitaxial layer, said first mask layer having a plurality of holes of desired shape so as to expose predetermined surface regions of the epitaxial layer;

doping the epitaxial layer with a desired impurity of said one conductivity type through the holes of the first mask layer in order to form a plurality of regions of said one conductivity type therein;

depositing a scond mask layer of an insulating material to cover each surface of said regions of one conductivity type in the epitaxial layer;

opening a hole of desired shape in a desired portion of said second mask layer existing on a predetermined surface of said regions;

doping said region of one conductivity type with an impurity of another conductivity type through the hole of the second mask layer, thereby forming a plurality of semiconductor circuit elements spaced apart from each other in the epitaxial layer;

depositing a third mask layer to cover the whole surface of the epitaxial layer;

opening a desired hole in said mask layers existing on the epitaxial layer between said semiconductor circuit elements, said hole encompassing one or more of said semiconductor circuit elements;

implanting ions of a desired element through the hole of said mask layers into the epitaxial layers exposed by the hole of the mask layers until the ion implanted region of the epitaxial layer is changed to an amorphous state, said amorphous state extending from the surface of the epitaxial layer to that of the substrate;

removing completely said mask layers from the surface of the epitaxial layer;

depositing an insulating film on the epitaxial layer so as to passivate the surface of the semiconductor circuit elements formed therein;

opening holes in the insulating film in order to expose electrode portions of said semiconductor elements; and electrically connecting the semiconductor circuit elements with each other by a conductor in order to fabricate a desired integrated semiconductor circuit.

2. A method for fabricating an integrated circuit according to claim 1, wherein the material of at least said third mask layer is selected from the group consisting of silicon dioxide, alumina, silicon nitride, tantalum, molybdenum, chromium, aluminum, gold and nickel.

3. A method for fabricating an integrated circuit according to claim 1, wherein the two impurities are doped by thermal diffusion.

4. A method for fabricting an integrated circuit according to claim 1, wherein the impurity doping is effected by implantation of ions defining the conduction type of the semiconductor.

5. A method for fabricating an integrated circuit according to claim 1, wherein said element used in the step of ion implantation is selected from the group consisting of hydrogen, helium, neon, argon, krypton and xenon, and from the elements of semiconductors such as silicon, germanium and carbon.

6. A method for fabricating an integrated circuit according to claim 1, wherein the step of ion implanting is the step of producing many lattice defects in the epitaxial layer, and said region including said many lattice defects has a high electrical resistivity.

7. A method according to claim 1, wherein the step of ion implanting is the step of implanting the ions into the epitaxial layer exposed by the hole of the mask layers until the ion implanted epitaxial layer is changed to an amorphous state.

8. A method for fabricating an integrated circuit comprising the steps of:

preparing a semiconductor epitaxial layer of one conductivity type on the surface of a single crystal-line substrate of an insulator such as sapphire;

forming a first mask layer on the surface of the semiconductor epitaxial layer, said first mask layer having a plurality of holes of desired shape so as to expose predetermined surface regions of the epitaxial layer;

doping the epitaxial layer with a desired impurity of said one conductivity type through the holes of the first mask layer in order to form a plurality of regions of said one conductivity type therein;

depositing a second mask layer of an insulating material to cover the surface of said regions of one conductivity type in the epitaxial layer;

opening a hole of desired shape in a desired portion of said second mask layer existing on a predetermined surface of said regions;

doping said region of one conductivity type with an impurity of another conductivity type through the hole of the second mask layer, thereby forming a plurality of semiconductor circuit elements spaced apart from each other in the epitaxial layer;

depositing a third mask layer to cover the whole surface of the epitaxial layer;

opening a desired hole in said third mask layer existing on the epitaxial layer between said semiconductor circuit elements, said hole encompassing one or more of said semiconductor circuit elements;

implanting ions of a desired element through the hole of said third mask layer in the epitaxial layer in order to form an amorphous state extending from the surface of the epitaxial layer to that of the substrate;

removing completely all of said mask layers from the surface of the epitaxial layer;

depositing an insulating film on the epitaxial layer so as to passivate the surface of the semiconductor circuit elements formed therein;

opening holes in the insulating film in order to expose the electrode portions of said semiconductor elements; and electrically connecting the semiconductor circuit elements with each other by a conductor in order to fabricate a desired integrated semiconductor circuit.

9. A method according to claim 8, wherein the desired element used for implanting ions is one which does not act as an active impurity in a semiconductor.

References Cited

UNITED STATES PATENTS

| | | | |
|---|---|---|---|
| 3,193,418 | 7/1965 | Cooper et al. | 148—189 |
| 3,393,088 | 7/1968 | Manasevit et al. | 117—106 |
| 3,477,886 | 11/1969 | Ehlenberger | 148—187 |
| 3,479,237 | 11/1969 | Bergh et al. | 156—11 |
| 3,484,313 | 12/1969 | Tauchi et al. | 148—187 |
| 3,533,857 | 10/1970 | Mayer et al. | 148—1.5 |
| 3,586,542 | 6/1971 | MacRae | 148—1.5 |
| 3,589,949 | 6/1971 | Nelson | 148—1.5 |
| 3,602,781 | 8/1971 | Hart | 317—235 R |
| 3,558,366 | 1/1971 | Lepselter | 148—1.5 |
| 3,560,278 | 2/1971 | Sanera | 148—187 |
| 3,563,809 | 2/1971 | Wilson | 148—186 X |

OTHER REFERENCES

Hunsperger, et al., "The Presence of Deep Levels in Ion Implanted Junctions," Applied Physics Letters, Amer. Inst. Phys., vol. 13, No. 9, Nov. 1, 1969, pp. 295–7.

L. DEWAYNE RUTLEDGE, Primary Examiner

J. M. DAVIS, Assistant Examiner

U.S. Cl. X.R.

148—186; 317—235 R